US012563384B2

(12) United States Patent
Kaushik et al.

(10) Patent No.: US 12,563,384 B2
(45) Date of Patent: Feb. 24, 2026

(54) SLICE INFORMATION MODIFICATION FOR A WIRELESS COMMUNICATION USER

(71) Applicant: T-MOBILE INNOVATIONS LLC, Overland Park, KS (US)

(72) Inventors: Subramania Kaushik, Bellevue, WA (US); Anil Kumar Mariyani, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 413 days.

(21) Appl. No.: 18/350,302

(22) Filed: Jul. 11, 2023

(65) Prior Publication Data

US 2025/0024251 A1 Jan. 16, 2025

(51) Int. Cl.
| | |
|---|---|
| *H04W 8/30* | (2009.01) |
| *H04W 48/08* | (2009.01) |
| *H04W 48/18* | (2009.01) |
| *H04W 64/00* | (2009.01) |

(52) U.S. Cl.
CPC ............. *H04W 8/30* (2013.01); *H04W 48/08* (2013.01); *H04W 48/18* (2013.01); *H04W 64/00* (2013.01)

(58) Field of Classification Search
CPC ....... H04W 8/30; H04W 48/08; H04W 48/18; H04W 64/00; H04W 60/04
See application file for complete search history.

(56) References Cited

U.S. PATENT DOCUMENTS

| | | | |
|---|---|---|---|
| 10,945,198 B2 | 3/2021 | Velev et al. | |
| 10,986,506 B2 * | 4/2021 | Velev ..................... | H04W 48/18 |
| 11,032,710 B2 | 6/2021 | Faccin et al. | |
| 2022/0272620 A1 | 8/2022 | Ninglekhu et al. | |
| 2023/0015471 A1 * | 1/2023 | Hashmi ................ | H04W 48/08 |
| 2023/0139780 A1 | 5/2023 | Kunz et al. | |
| 2025/0184942 A1 * | 6/2025 | Chun ..................... | H04W 48/18 |

FOREIGN PATENT DOCUMENTS

| | | |
|---|---|---|
| WO | 2021204369 A1 | 10/2021 |

* cited by examiner

*Primary Examiner* — Christopher M Brandt

(57) ABSTRACT

A wireless communication system modifies wireless network slice information for a wireless communication user. The wireless communication system detects a modification to the wireless network slice information for the wireless communication user. In response to the modification detection, the wireless communication system transfers a slice information modification message to a wireless communication device for the wireless communication user. The wireless communication system detects a failure of the slice information modification message sent to the wireless communication device. In response to the failure detection, the wireless communication system transfers another slice information modification message to the wireless communication device.

20 Claims, 10 Drawing Sheets

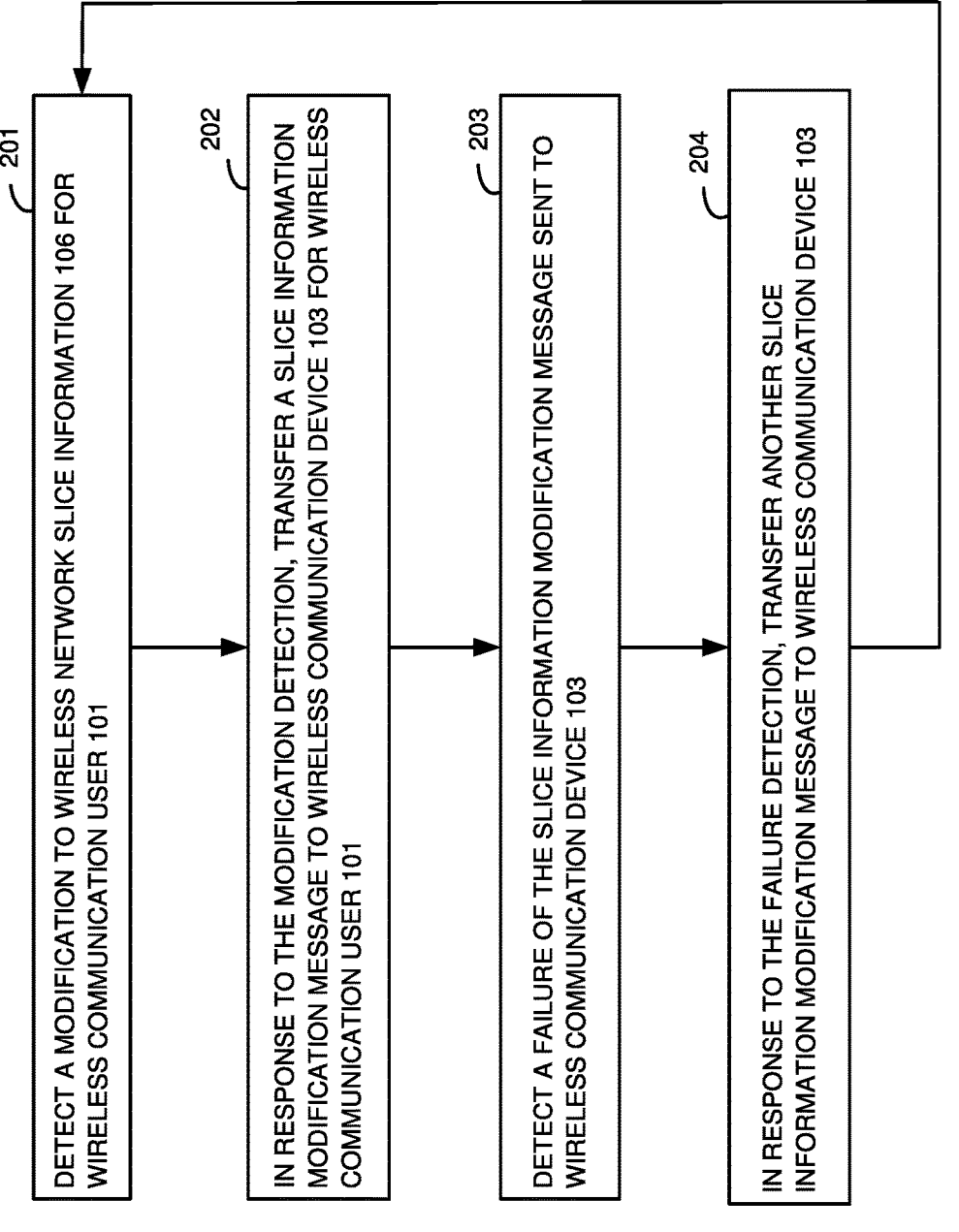

DETECT A MODIFICATION TO WIRELESS NETWORK SLICE INFORMATION 106 FOR WIRELESS COMMUNICATION USER 101

IN RESPONSE TO THE MODIFICATION DETECTION, TRANSFER A SLICE INFORMATION MODIFICATION MESSAGE TO WIRELESS COMMUNICATION DEVICE 103 FOR WIRELESS COMMUNICATION USER 101

DETECT A FAILURE OF THE SLICE INFORMATION MODIFICATION MESSAGE SENT TO WIRELESS COMMUNICATION DEVICE 103

IN RESPONSE TO THE FAILURE DETECTION, TRANSFER ANOTHER SLICE INFORMATION MODIFICATION MESSAGE TO WIRELESS COMMUNICATION DEVICE 103

SLICE INFORMATION MODIFICATION FOR A WIRELESS COMMUNICATION USER

TECHNICAL BACKGROUND

Wireless communication networks provide wireless data services to wireless communication devices like phones, computers, and other user devices. The wireless data services may include internet-access, messaging, conferencing, or some other data communication functionality. Wireless communication networks comprise wireless access nodes like Wireless Fidelity (WIFI) transceivers and Fifth Generation New Radio (5GNR) base stations. Wireless communication networks comprise additional network elements like Access and Mobility Management Functions (AMFs), Unified Data Management (UDMs), Unified Data Repositories (UDRs), and User-Plane Functions (UPFs).

Wireless network slices comprise specialized network elements that are customized for specific types of data communications. For example, an internet-access slice may feature a highly-secure UPF that is customized to serve as an internet gateway, while a video-conferencing slice may feature a low-latency UPF that is customized to serve high-speed access to a video server. The UEs request and use the different network slices based on the available slices and the current user need.

Many new network slices are being deployed at an ever-increasing rate. A wireless communication device is notified of the new network slices during network registration. After receiving network slice information during network registration, the wireless communication device then requests and uses the new network slice as needed. If the wireless communication device does not perform a new network registration, then the new network slice remains unknown to the device and cannot be requested or used. Some wireless communication devices rarely perform network registration, so their network slice updates and new slice usage are correspondingly rare. When roaming, a wireless communication device may not be informed of new network slices during network registration over the roaming network.

In some situations, a wireless communication device may use a new network slice by default without making a slice request, but many new network slices will not be available by default and will remain unused. Unfortunately, current wireless communication networks do not efficiently deploy new network slices. Moreover, the current wireless communication networks do not effectively inform the wireless communication devices of the new network slices.

Technical Overview

In some examples, a method to modify wireless network slice information for a wireless communication user comprises the following. A modification to the wireless network slice information for the wireless communication user is detected. In response to the modification detection, a slice information modification message is transferred to a wireless communication device for the wireless communication user. A failure of the slice information modification message sent to the wireless communication device is detected. In response to the failure detection, another slice information modification message is transferred to the wireless communication device.

In some examples, one or more non-transitory machine-readable storage media store processing instructions that direct processing circuitry to modify wireless network slice information for a wireless communication user by performing the following method. A modification to the wireless network slice information for the wireless communication user is detected. In response to the modification detection, a slice information modification message is transferred to a wireless communication device for the wireless communication user. A failure of the slice information modification message sent to the wireless communication device is detected. In response to the failure detection, another slice information modification message is transferred to the wireless communication device.

In some examples, a wireless communication network modifies wireless network slice information for a wireless communication user. The wireless communication system comprises a Unified Data Repository (UDR), Unified Data Management (UDM), Access and Mobility Management Function (AMF), and wireless User Equipment (UE). The UDR detects a modification to the wireless network slice information for the wireless communication user. In response, the UDR notifies the UDM of the modification to the wireless network slice information for the wireless communication user. In response to the notification from the UDR, the UDM determines when a wireless communication device for the wireless communication user is in communication with the wireless communication system. In response to the determination that the wireless communication device is in communication with the wireless communication system, the UDM transfers a request to the AMF, and in response to the request from the UDM, the AMF transfers a slice information modification message to the wireless UE.

DESCRIPTION OF THE DRAWINGS

FIG. 2 illustrates an exemplary operation of the wireless communication system to modify wireless network slice information for a wireless communication user.

DETAILED DESCRIPTION

Figure 1:
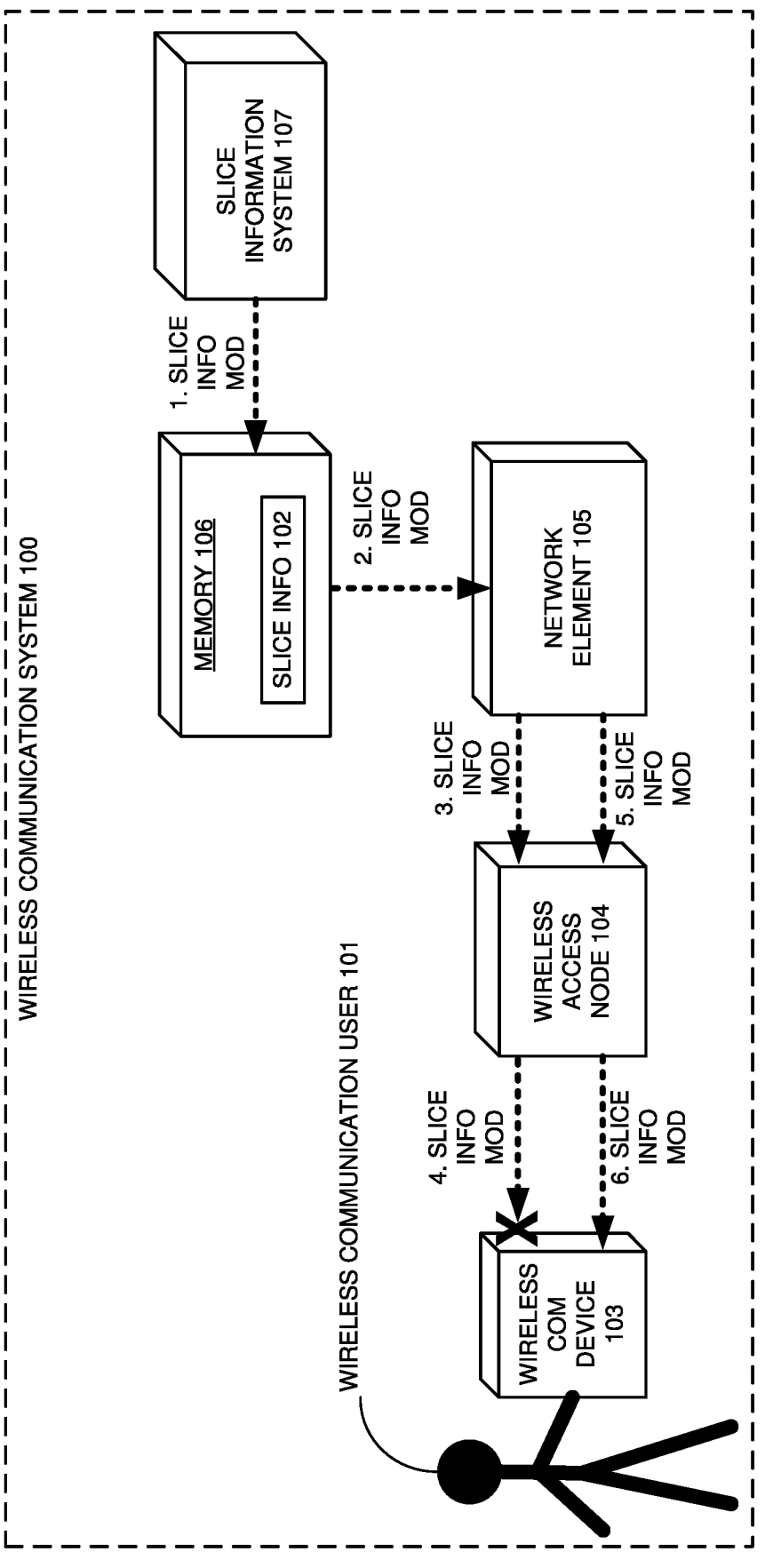
FIG. 1 illustrates an exemplary wireless communication system to modify wireless network slice information for a wireless communication user.

FIG. 1 illustrates exemplary wireless communication system 100 to modify wireless network slice information 102 for wireless communication user 101. Wireless communication system 100 comprises wireless communication device 103, wireless access node 104, network element 105, memory 106, and slice information system 107. Wireless communication device 103 comprises a phone, computer, vehicle, sensor, or some other user apparatus with wireless communication circuitry. Slice information 102 comprises Network Slice Selection Assistance Information (NSSAI), Slice Service Type (SST), Slice Differentiator (SD), or some other slice characteristics. The amount of wireless communication devices, wireless access nodes, network elements, and memories that are shown in FIG. 1 has been restricted for clarity. Wireless communication user 101 is depicted in FIG. 1 as a person, but wireless communication user 101 may be a corporation, agency, vehicle, or some other entity.

Various examples of system operation and configuration are described herein. In some examples, slice information system 107 modifies (MOD) slice information 102 in memory 106 for wireless communication user 101 (operation #1). The modification comprises the addition, change, and/or deletion of at least a portion of slice information 102. Memory 106 detects the modification to wireless network slice information 102 for wireless communication user 101 and notifies network element 105 (operation #2). In response to the modification detection, network element 105 transfers a slice information modification message for wireless communication user 101 to wireless communication device 103 over wireless access node 104 (operations #3-4). The slice information modification message comprises one or more instructions to add, change, and/or delete wireless network slice information 102 in wireless communication device 103. This initial slice information modification fails—possibly due to a lack of delivery, data corruption, device 103 error, or some other cause. Network element 105 detects the failure of the slice information modification message sent to wireless communication device 103, and in response, network element 105 transfers another slice information modification message for wireless communication user 101 to wireless communication device 103 over wireless access node 104 (operations #5-6). For example, a Unified Data Management (UDM) could detect a message delivery failure and send another slice information modification message to wireless communication device 103 over an Access and Mobility Management Function (AMF) and wireless access node 104. Wireless communication device 103 modifies slice information 102 for user 101 in response to the other slice information modification message. In other examples, there are more message failures and re-transfers than the amount shown on FIG. 1.

In some examples, slice information system 102 modifies slice information 102 in memory 106 after wireless communication device 103 has already registered with wireless communication system 100, and network element 105 transfers the slice information modification message to wireless communication device 103 before wireless communication device 103 performs a new system registration. In some examples, the modification to wireless network slice information 102 is for a specific user device type. When wireless communication device 103 comprises the user device type and device 103 is in communication with system 100, network element 105 transfers the slice information modification message to wireless communication device 103. In some examples, the modification to wireless network slice information 102 is for a specific geographic area. When wireless communication device 103 is in the geographic area and device 103 is in communication with system 100, network element 105 transfers the slice information modification message to wireless communication device 103. In a similar manner, wireless communication system 100 can implement per Tracking Area (TA) slices and per Radio Access Technology (RAT) slices. Wireless communication system 100 would transfer slice information modification messages to wireless communication device 103 for a specific TA when device 103 is currently located in the specific TA. Wireless communication system 100 would transfer slice information modification messages to wireless communication device 103 for a specific RAT when device 103 is currently using the specific RAT. For example, wireless communication system 100 would transfer slice information modification messages to wireless communication device 103 for a satellite communication slice when device 103 is currently using a satellite communication system that hosts the satellite communication slice.

Wireless communication device 103 and wireless access node 104 comprise one or more radios that wirelessly communicate using wireless protocols like WIFI (Institute of Electrical and Electronics Engineers 802.11), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications. Wireless communication system 101 comprises microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of wireless communication system 100 as described herein.

FIG. 2 illustrates an exemplary operation of wireless communication system 100 to modify wireless network slice information 102 for wireless communication user 101. The operation may vary in other examples. Wireless communication system 100 detects a modification to wireless network slice information 102 for wireless communication user 101 (201). Wireless communication system 100 transfers a slice information modification message to wireless communication device 103 for wireless communication user 101 in response to the modification detection (202). Wireless communication system 100 detects a failure of the slice information modification message that was sent to wireless communication device 103 (203). In response to the failure, wireless communication system 100 transfers another slice information modification message to wireless communication device 103 (204). In other examples, there are more message failures and re-transfers than the amount shown in FIG. 2.

Figure 3:
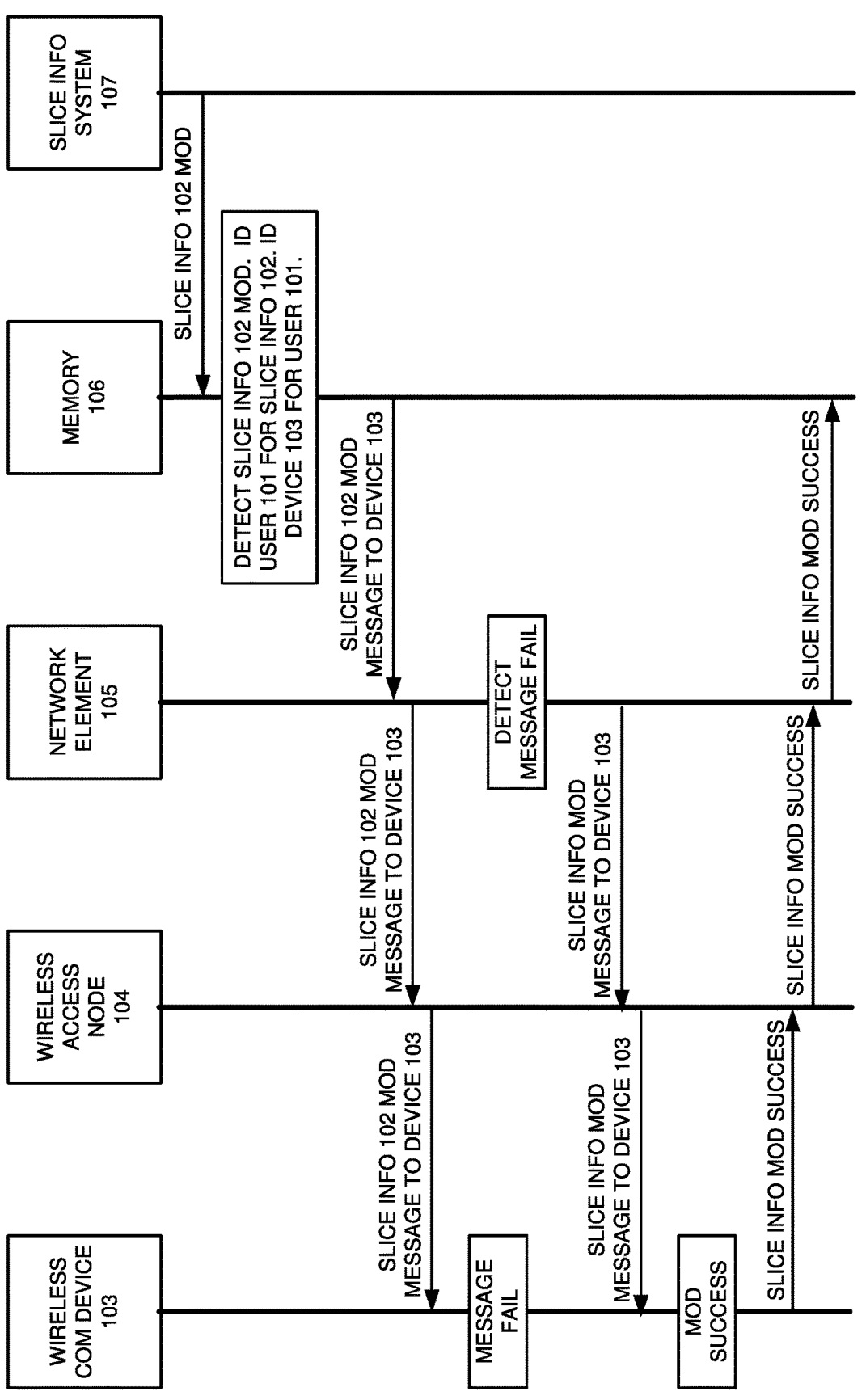
FIG. 3 illustrates an exemplary operation of the wireless communication system to modify wireless network slice information for a wireless communication user.

FIG. 3 illustrates an exemplary operation of wireless communication system 100 to modify wireless network slice information 102 for wireless communication user 101. The operation may vary in other examples. Slice information system 107 modifies slice information 102 in memory 106 for wireless communication user 101. The modification comprises the addition, change, and/or deletion of at least a portion of slice information 102. Memory 106 detects the modification to wireless network slice information 102 and sets a corresponding flag. For example, memory 106 detects the instruction from slice information system 107 to store, change, or delete data in the memory field for Network Slice Selection Assistance Information (NSSAI) for wireless communication user 101. Memory 106 identifies wireless communication user 101 for slice information 102—possibly through a relational data storage association. Memory 106 identifies wireless communication device 103 for wireless communication user 101—possibly through a relational data storage association. Memory 106 notifies network element 105 of the modification to slice information 102 for wireless communication device 103. In response to the notice from memory 106, network element 105 transfers a slice information modification message that indicates the modification of slice information 102 to wireless communication device 103 over wireless access node 104. This initial slice information modification fails—possibly due to a lack of delivery, data corruption, device 103 error, or some other cause. Network element 105 detects the failure of the slice information modification message sent to wireless communication device 103, and in response, network element 105 transfers another slice information modification message to wireless communication device 103 over wireless access node 104. For example, a UDM could detect a message delivery failure and send another slice information modification message to wireless communication device 103 over an AMF and wireless access node 104. Wireless communication device 103 successfully modifies slice information 102 in response to this slice information modification message and transfers an indication to network element 105 over wireless access node 104 that the requested modification to slice information 102 was successful. In response to the indication, network element 105 transfers an indication to memory 106 that the requested modification to slice information 102 was successful, and memory 106 clears the flag for the modification of slice information 102. In other examples, there are more message failures and re-transfers than the amount shown in FIG. 3.

Advantageously, wireless communication system 100 efficiently deploys new slices. Moreover, wireless communication system 100 effectively informs wireless communication device 103 of new network slice information.

Figure 4:
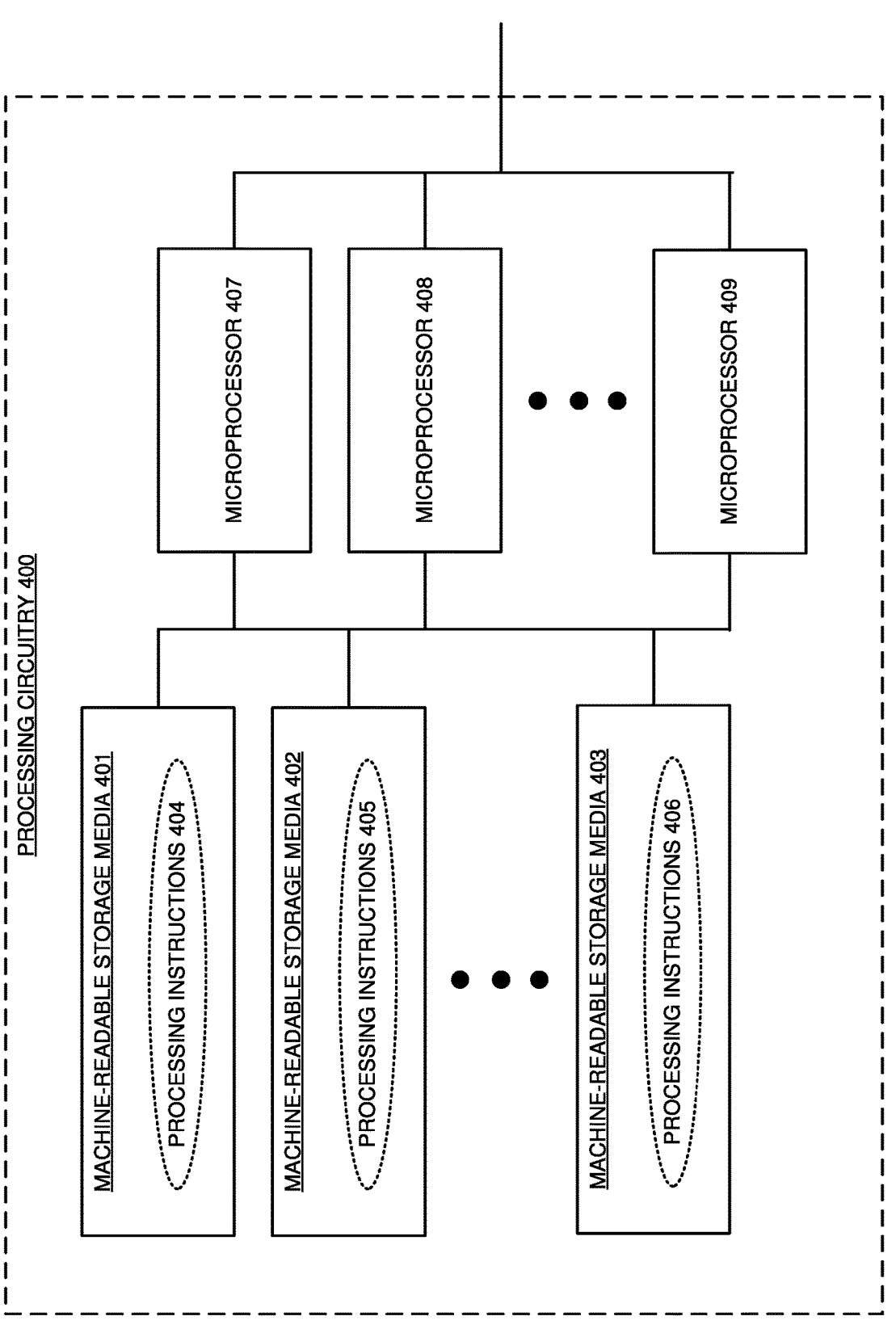
FIG. 4 illustrates exemplary processing circuitry to modify wireless network slice information for a wireless communication user.

FIG. 4 illustrates exemplary processing circuitry 400 to modify wireless network slice information for a wireless communication user. Processing circuitry 400 comprises an example of wireless communication device 103, network element 105, and memory 106, although device 103, element 105, and memory 106 may differ. Processing circuitry 400 comprises machine-readable storage media 401-403 and microprocessors 407-409 that are communicatively coupled. Machine-readable storage media 401-403 store processing instructions 404-406 in a non-transitory manner. Microprocessors 407-409 comprise DSPs, CPUs, GPUs, ASICs, and/or some other data processing hardware. Machine-readable storage media 401-403 comprises RAM, flash circuitry, disk drives, and/or some other type of data storage. Microprocessors 407-409 retrieve processing instructions 404-406 from non-transitory machine-readable storage media 401-403. Microprocessors 407-409 execute processing instructions 404-406 to modify wireless network slice information for a wireless communication user as described above for wireless communication system 100 and described below for wireless communication network 500. The amount of storage media, microprocessors, processing instructions that are shown in FIG. 4 is exemplary and may vary in other examples.

Figure 5:
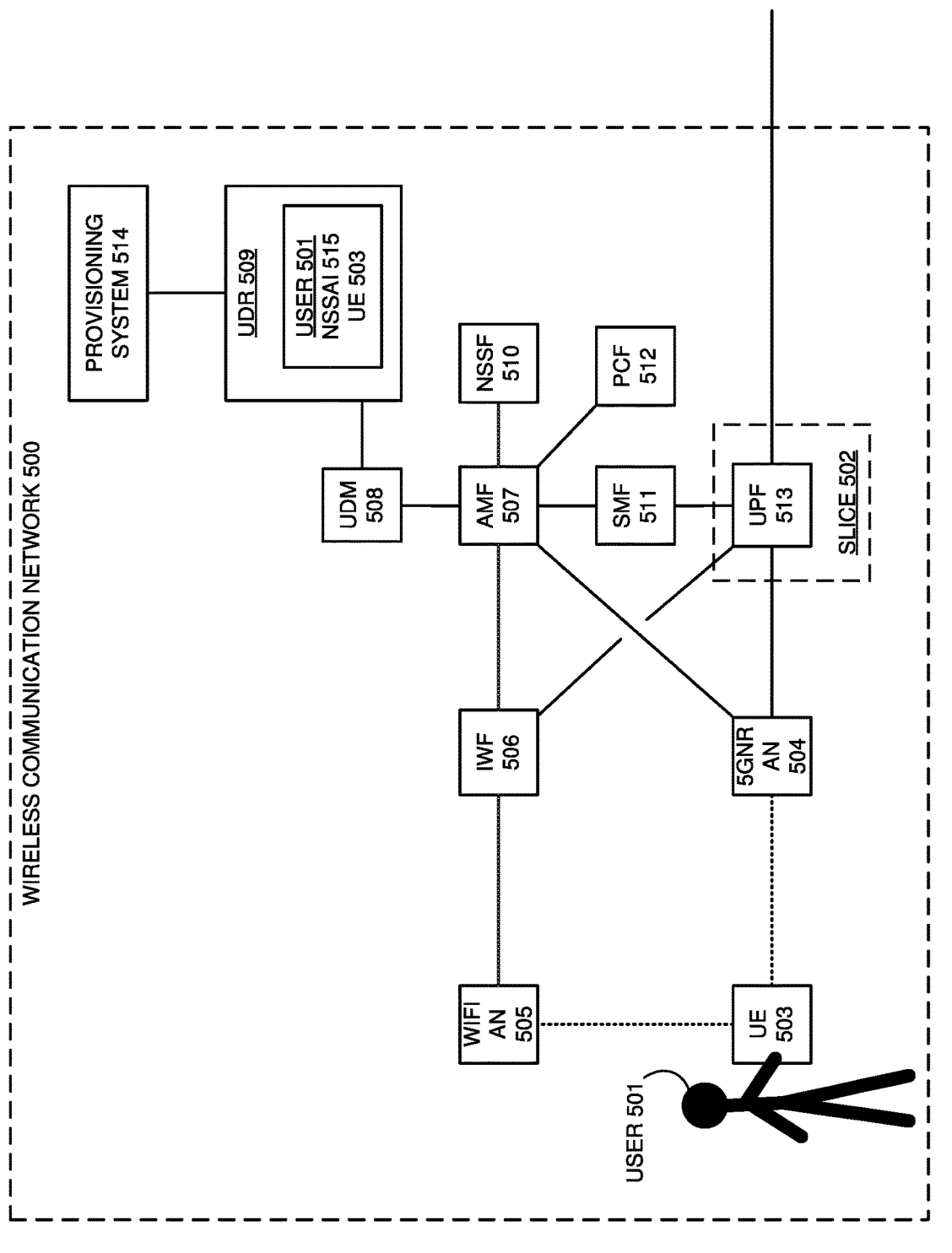
FIG. 5 illustrates an exemplary wireless communication network to modify wireless network slice information for a wireless communication user.

FIG. 5 illustrates exemplary wireless communication network 500 to modify NSSAI 515 for wireless communication user 501. Wireless communication network 500 comprises an example of wireless communication system 100, although system 100 may differ. Wireless communication network 500 comprises UE 503, Fifth Generation New Radio Access Node (5GNR AN) 504, WIFI AN 505, Non-Third Generation Partnership Project Interworking Function (IWF) 506, Access and Mobility Management Function (AMF) 507, Unified Data Management (UDM) 508, Unified Data Repository (UDR) 509, Network Slice Selection Function (NSSF) 510, Session Management Function (SMF) 511, Policy Control Function (PCF) 512, User Plane Function (UPF) 513, and provisioning system 514. Wireless network slice 502 comprises UPF 513.

UE 503 comprises an example of wireless communication device 103, although device 103 may differ. 5GNR AN 504 and WIFI AN 505 comprise examples of wireless access node 104, although node 104 may differ. AMF 507 and UDM 508 comprise examples of network element 105, although network element 105 may differ. UDR 509 comprises an example of memory 106, although memory 106 may differ. Provisioning system 514 comprises an example of slice information system 107, although system 107 may differ. UDR 509 stores identifying information for wireless communication user 501. UDR 509 stores identifying information for UE 503 in association with the user identifier for wireless network user 501.

UE 503 registers with AMF 507 over 5GNR AN 504 and/or WIFI AN 505-IWF 506. AMF 507 interacts with UDM 508 to authenticate and authorize UE 503 for service—possibly over an Authentication and Security Function (AUSF) that is omitted for clarity. AMF 507 and UE 503 establish an N1 signaling link over 5GNR AN 504 and/or WIFI AN 505-IWF 506. At this point, UE 503 requests slices other than slice 502, because UE 503 is unaware of NSSAI 515 and cannot request wireless network slice 502.

Provisioning system 514 adds Network Slice Selection Assistance Information (NSSAI) 515 for wireless network slice 502 to UDR 509 in association with the user identifier for wireless communication user 501. Thus, UDR 509 now stores NSSAI 515 for wireless network slice 502 in association with UE 503. UDR 509 detects new NSSAI 515 for wireless communication user 501 and responsively identifies associated UE 503. UDR 509 sets a flag to note new NSSAI 515 for UE 503. UDR 509 signals UDM 508 to transfer new NSSAI 515 to UE 503.

UDM 508 determines if UE 501 is in communication with AMF 507 based on the prior registration transaction with AMF 507 and the lack of a corresponding de-registration. In response to the indication of new NSSAI 515 for UE 503 from UDR 509 and to the current registration of UE 503 by AMF 507, UDM 508 transfers a Hyper-Text Transfer Protocol (HTTP) message to AMF 507 to add NSSAI 515 to UE 503. In response to the HTTP message from UDM 508, AMF 507 transfers the HTTP message to UE 503 over the N1 signaling link that traverses 5GNR AN 504 and/or WIFI AN 505-IWF 506.

The HTTP message delivery fails due to a communication error, corrupt message data, UE 503 error, AMF 507 error, or some other reason. Due to this failure, UDM 509 does not receive an HTTP message delivery acknowledgement and determines that the HTTP message delivery has failed. In response to the HTTP message delivery failure, UDM 508 retries to send the HTTP message to UE 503 over AMF 507. UDM 508 transfers another HTTP message to AMF 507 to add NSSAI 515 to UE 503. AMF 507 transfers the other HTTP message to UE 503 over the N1 signaling link that traverses 5GNR AN 504 and/or WIFI AN 505-IWF 506. The HTTP message delivery may fail again and UDM 508 would retry to send the HTTP message in a similar manner. After a configured number of such failures, UDM 508 stops trying and generates a failure notice for UE 503 and NSSAI 515.

Typically, UE 503 eventually receives the HTTP message with NSSAI 515, and in response, UE 503 transfers an HTTP message delivery acknowledgement to AMF 507 over the N1 signaling link that traverses 5GNR AN 504 and/or WIFI AN 505-IWF 506. AMF 507 transfers the HTTP message delivery acknowledgement to UDM 508. In response to the HTTP message delivery acknowledgement, UDM 508 stops re-transfer operations and signals UDR 509 that UE 503 has NSSAI 515. UDR 509 clears the flag that was set for the transfer of new NSSAI 515 to UE 503. Note that UDR 509 modifies NSSAI 515 after UE 401 has already registered with AMF 507, and UDM 508 transfers the slice information modification message to UE 503 before UE 503 performs a new network registration with AMF 507.

The above operation for new NSSAI 515 would be similar if NSSAI 515 is modified in UDR 509. For example, the Slice Service Type (SST) in NSSAI 515 may be changed by provisioning system 514, the above operation would be used to change the SST for NSSAI 515 in UE 503. If provisioning system 514 deletes NSSAI 515 for UE 503 from UDR 509, the above operation would be used to delete NSSAI 515 from UE 503. If the HTTP message delivery to UE 503 fails due to a communication error, corrupt message data, UE 503 error, AMF 507 error, or some other reason, then UDM 508 retries to send the message to UE 503 over AMF 507.

In some examples, UDR 509 detects an NSSAI modification for a user device type—like a device type that has satellite communication capability. UDR 508 or UDM 509 determine that wireless UE 503 comprises the user device type and that UE 503 is in communication with AMF 507. In response to both of these determinations, UDM 508 transfers the NSSAI modification to UE 503 over AMF 507. In some examples, UDR 509 detects an NSSAI modification for a user geographic location—like a geographic location in a hospital. UDR 508 or UDM 509 determine that wireless UE 503 is located in the geographic location and that UE 503 is in communication with AMF 507. In response to both of these determinations, UDM 508 transfers the NSSAI modification to UE 503 over AMF 507. In a similar manner, wireless communication system 100 can modify NSSAIs in UE 503 for specific Tracking Areas (TAs) and specific Radio Access Technologies (RATs). UDR 508 may transfer the HTTP messages to modify an NSSAI in UE 503 when UE 503 is authorized for a new slice in a specific TA and is currently located in the specific TA. UDR 508 may transfer the HTTP messages to modify an NSSAI in UE 503 when UE 503 is authorized for a new slice that uses a specific RAT and is currently using the specific RAT. For example, UDR 508 would transfer HTTP messages to modify the NSSAI in UE 503 when UE 503 is authorized to use a new satellite slice and is currently using the satellite data system that hosts the new satellite slice. UDM 508 would retry to send the HTTP message to UE 503 over AMF 507 in the event of a message delivery failure.

Figure 6:
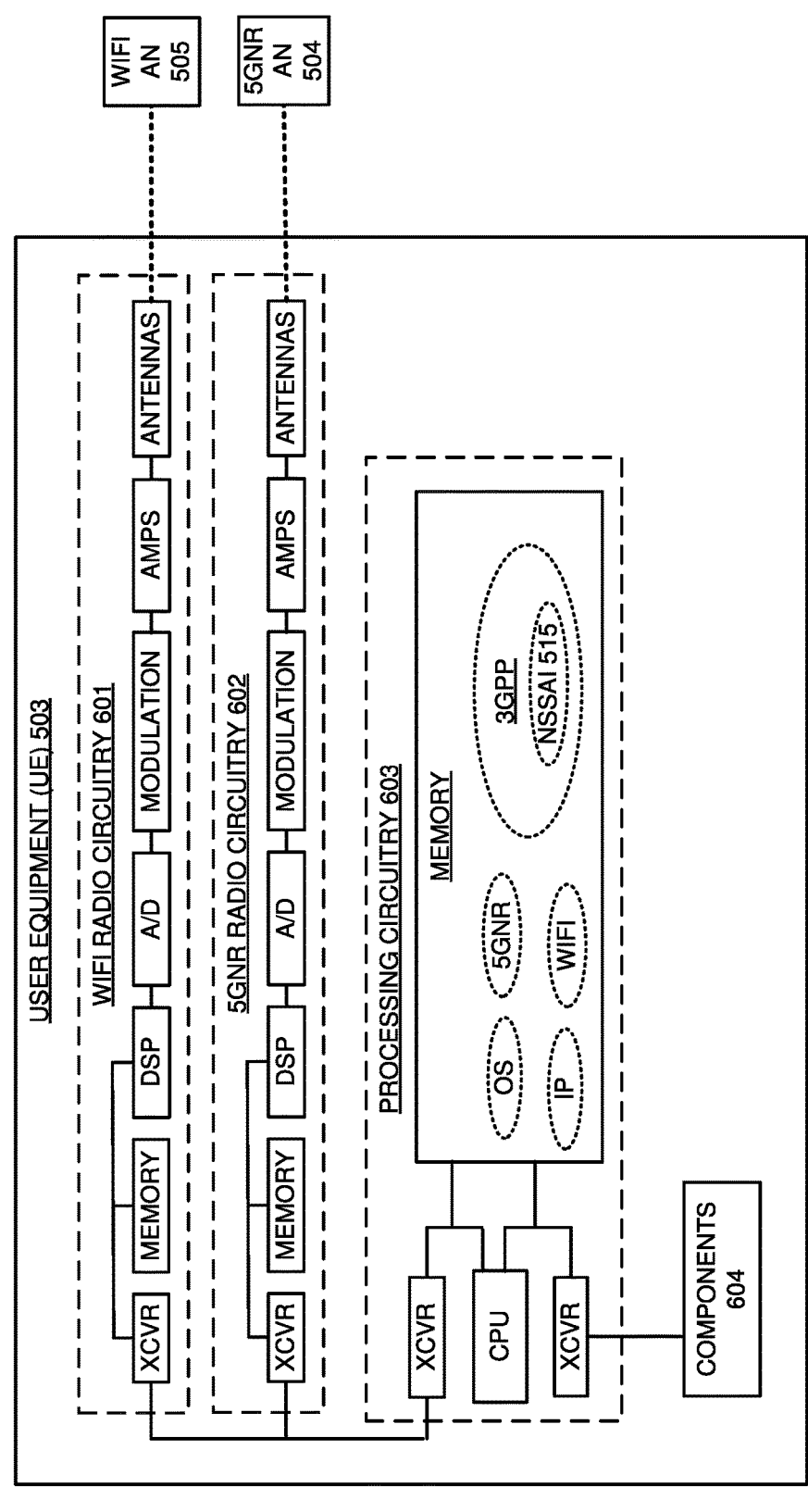
FIG. 6 illustrates an exemplary wireless User Equipment (UE) in the wireless communication network to modify wireless network slice information for a wireless communication user.

FIG. 6 illustrates exemplary wireless User Equipment (UE) 503 in wireless communication network 500 to modify NSSAI 515 for wireless communication user 501. UE 503 comprises an example of wireless communication device 103 and processing circuitry 400, although device 103 and circuitry 400 may differ. UE 503 comprises WIFI radio circuitry 601, 5GNR radio circuitry 602, processing circuitry 603, and components 604. Components 604 comprise sensors, cameras, medical devices, and/or some other user apparatus. Radios 601-602 comprise antennas, amplifiers, filters, modulation, analog-to-digital interfaces, DSPs, memories, and transceivers (XCVRs) that are coupled over bus circuitry. Processing circuitry 603 comprises one or more CPUs, one or more memories, and one or more transceivers that are coupled over bus circuitry. The one or more memories in processing circuitry 603 store software like an Operating System (OS), 5GNR application (5GNR), 3GPP application (3GPP), Internet Protocol application (IP), and WIFI application (WIFI). The antennas in WIFI radio circuitry 601 exchange WIFI signals with WIFI AN 505. The antennas in 5GNR radio circuitry 602 exchange 5GNR signals with 5GNR AN 504. Transceivers in radios 601-602 are coupled to transceivers in processing circuitry 603. In processing circuitry 603, the one or more CPUs retrieve the software from the one or more memories and execute the software to direct the operation of UE 503 as described herein.

In particular, the executing 3GPP application in UE 503 receives an HTTP message having NSSAI 515 from AMF 507 (not shown) over the N1 signaling link. The executing 3GPP application stores NSSAI 515 for the subsequent use of wireless network slice 502. The executing 3GPP application in UE 503 transfers an acknowledgement for the HTTP message to AMF 507 over the N1 signaling link.

Figure 7:
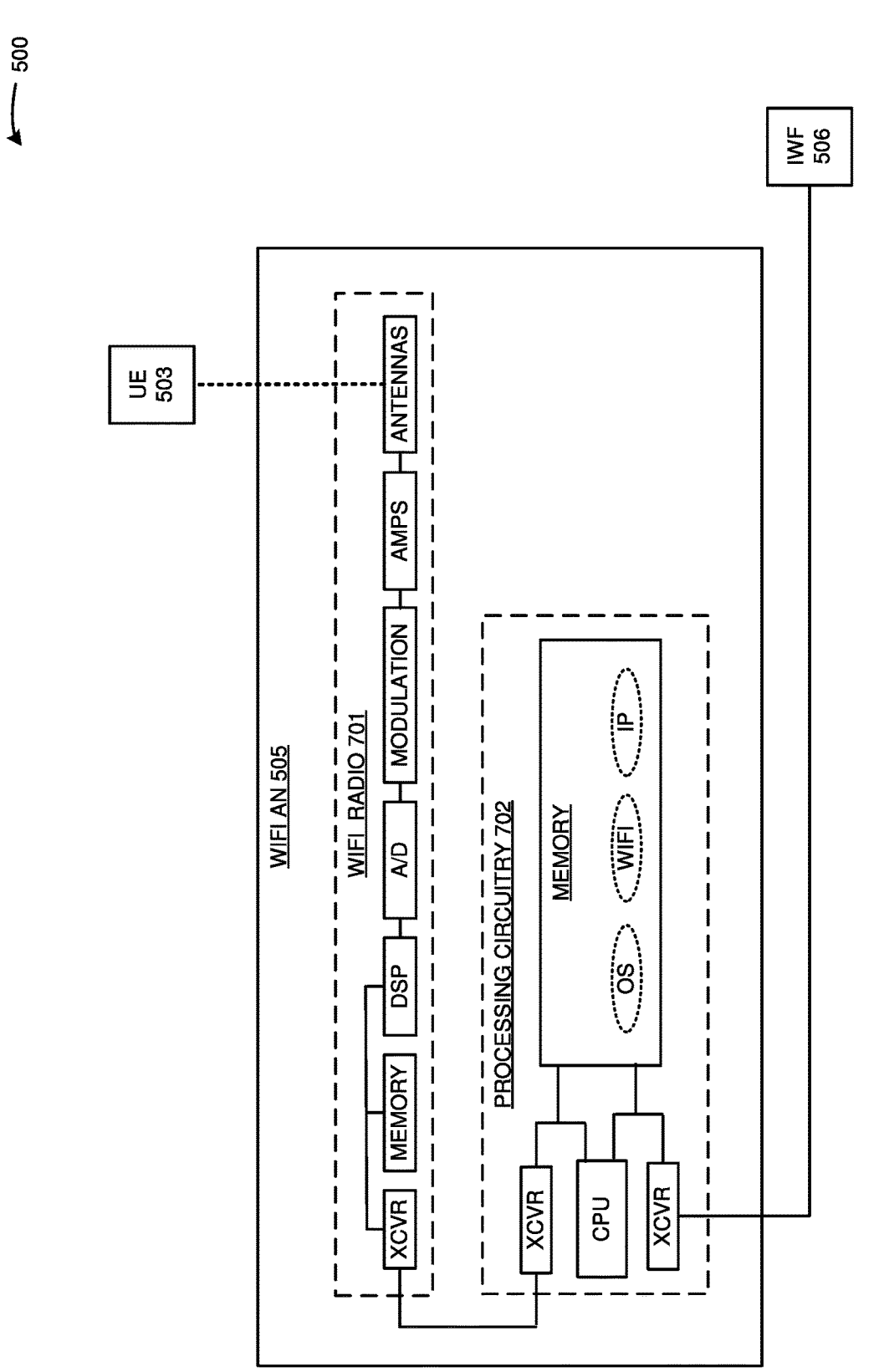
FIG. 7 illustrates an exemplary WIFI access node in the wireless communication network to modify wireless network slice information for a wireless communication user.

FIG. 7 illustrates exemplary WIFI access node 505 in wireless communication network 500 to modify NSSAI 515 for wireless communication user 501. WIFI AN 505 comprises an example of wireless access node 104, although node 104 may differ. WIFI AN 505 comprises WIFI radio 701 and processing circuitry 702. Radio 701 comprises antennas, amplifiers, filters, modulation, analog-to-digital interfaces, DSPs, memories, and transceivers (XCVRs) that are coupled over bus circuitry. Processing circuitry 702 comprises one or more CPUs, one or more memories, and one or more transceivers that are coupled over bus circuitry. The one or more memories in processing circuitry 702 store software like an Operating System (OS), WIFI application (WIFI), and IP application (IP). The antennas in WIFI radio 701 exchange WIFI signals with UE 503. Transceivers in radio 701 are coupled to transceivers in processing circuitry 702. Transceivers in processing circuitry 702 are coupled to transceivers in IWF 506. In processing circuitry 702, the one or more CPUs retrieve the software from the one or more memories and execute the software to direct the operation of WIFI AN 505 as described herein.

Figure 8:
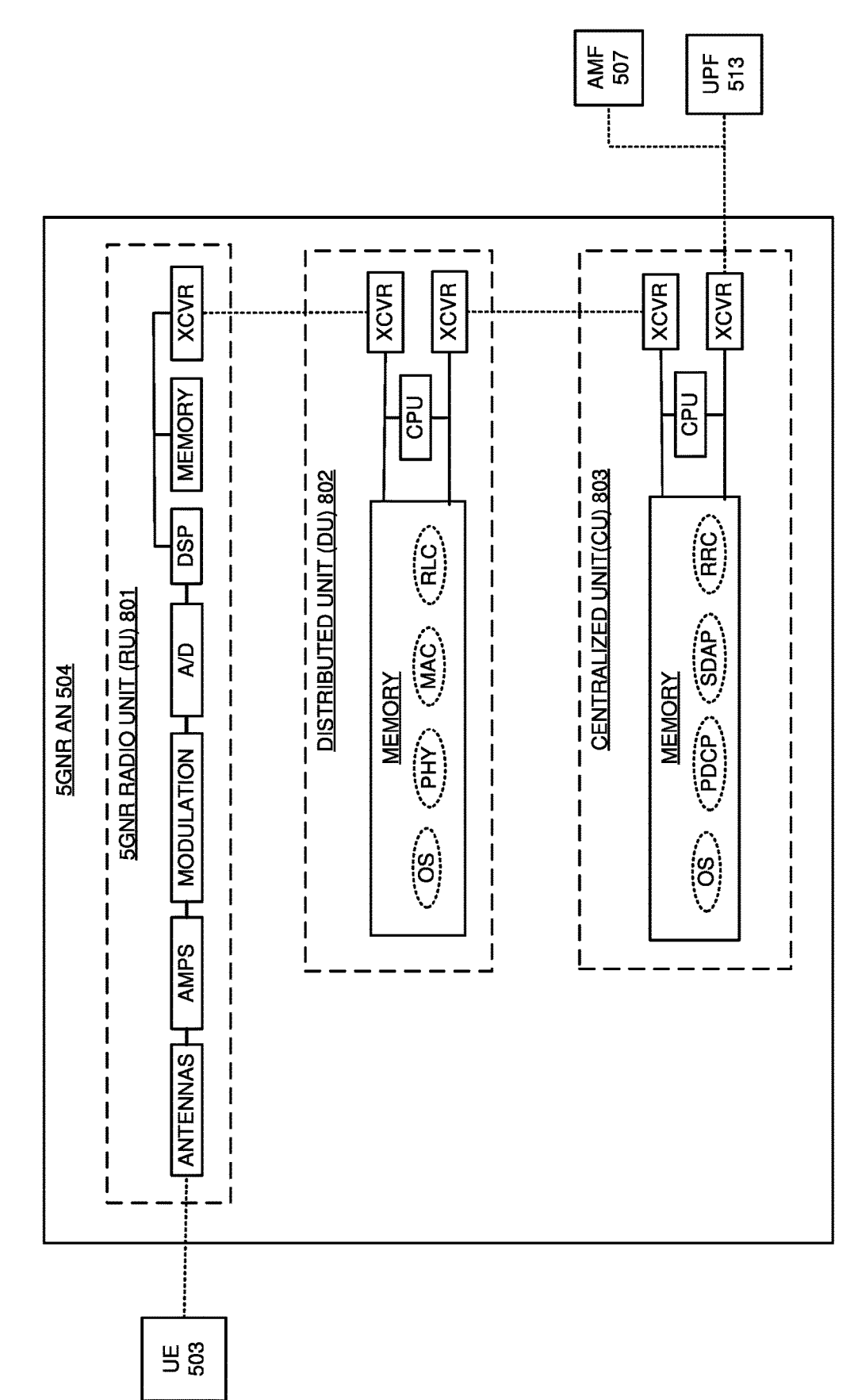
FIG. 8 illustrates an exemplary Fifth Generation New Radio (5GNR) access node in the wireless communication network to modify wireless network slice information for a wireless communication user.

FIG. 8 illustrates exemplary Fifth Generation New Radio (5GNR) access node 504 in wireless communication network 500 to modify NSSAI 515 for wireless communication user 501. 5GNR AN 504 comprises an example of wireless access node 104, although node 104 may differ. 5GNR AN 504 comprises 5GNR Radio Unit (RU) 801, Distributed Unit (DU) 802, and Centralized Unit (CU) 803. 5GNR RU 801 comprises antennas, amplifiers, filters, modulation, analog-to-digital interfaces, DSP, memory, radio applications, and transceivers that are coupled over bus circuitry. DU 802 comprises memory, CPU, user interfaces and components, and transceivers that are coupled over bus circuitry. The memory in DU 802 stores operating system and 5GNR network applications for Physical Layer (PHY), Media Access Control (MAC), and Radio Link Control (RLC). CU 803 comprises memory, CPU, and transceivers that are coupled over bus circuitry. The memory in CU 803 stores an operating system and 5GNR network applications for Packet Data Convergence Protocol (PDCP), Service Data Adaption Protocol (SDAP), and Radio Resource Control (RRC). The antennas in 5GNR RU 801 are wirelessly coupled to UE 503 over 5GNR links. Transceivers in 5GNR RU 801 are coupled to transceivers in DU 802. Transceivers in DU 802 are coupled to transceivers in CU 803. Transceivers in CU 803 are coupled to AMF 507 and UPF 513. The DSP and CPU in RU 701, DU 702, and CU 703 execute the radio applications, operating systems, and network applications to exchange data and signaling with UE 503, AMF 507, and UPF 513 as described herein.

Figure 9:
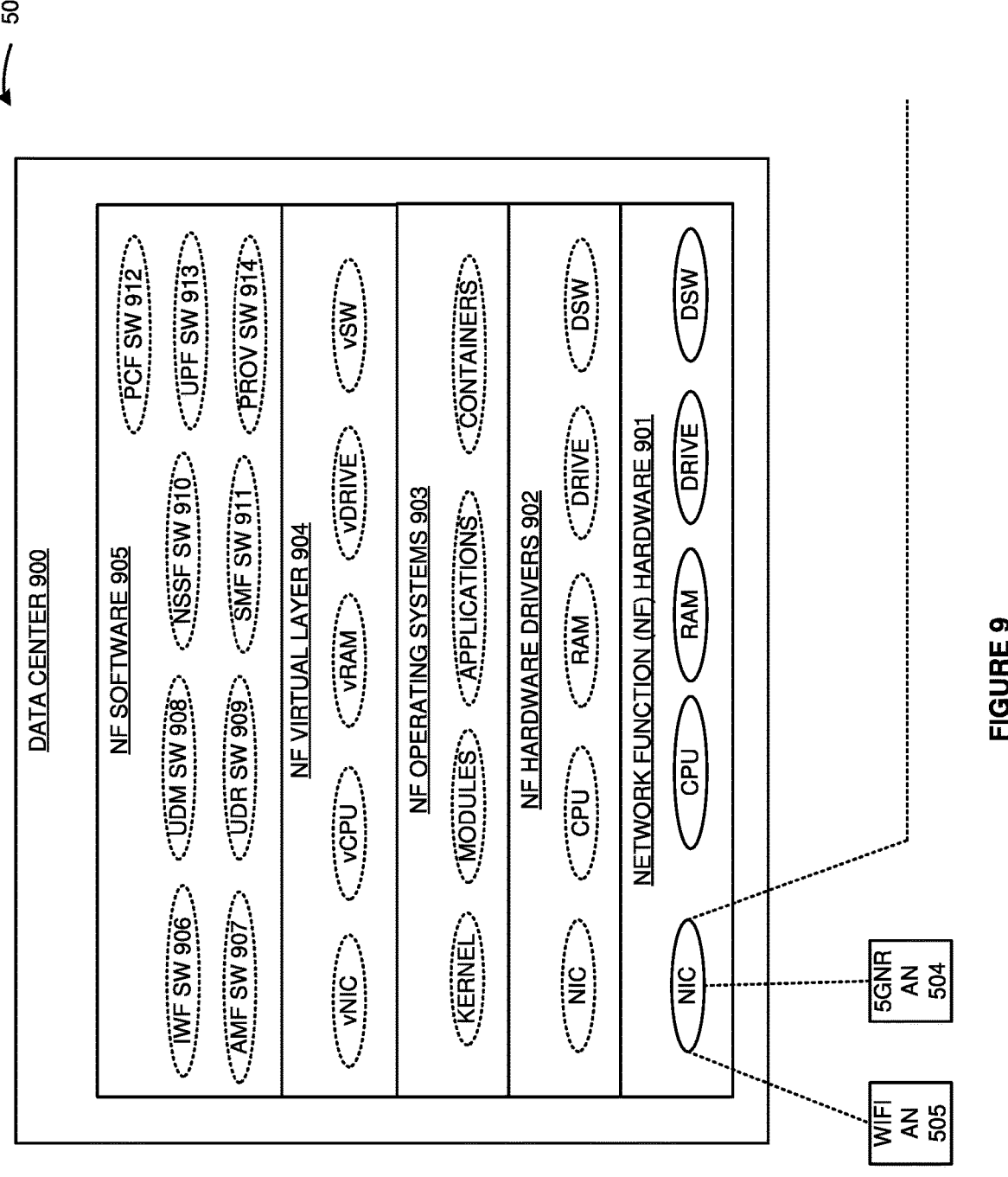
FIG. 9 illustrates an exemplary data center in the wireless communication network to modify wireless network slice information for a wireless communication user.

FIG. 9 illustrates exemplary data center 900 in wireless communication network 500 to modify NSSAI 515 for wireless communication user 501. Data center 900 comprises an example of network element 105, memory 106, slice information system 107, and processing circuitry 400, although element 105, memory 106, system 107, and circuitry 400 may differ. Data center 900 comprises NF hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, applications, and containers. NF virtual layer 904 comprises vNIC, vCPU, vRAM, vDRIVE, and vSW. NF SW 905 comprises IWF SW 906, AMF SW 907, UDM SW 908, UDR SW 909, NSSF SW 910, SMF SW 911, PCF SW 912, UPF SW 913, and provisioning system (PROV) SW 914. The NIC in NF hardware 901 are coupled to 5GNR AN 411, WIFI AN 505, and external systems. NF hardware 901 executes NF hardware drivers 902, NF operating systems 903, NF virtual layer 904, and NF SW 905 to form and operate IWF 506, AMF 507, UDM 508, UDR 509, NSSF 510, SMF 511, PCF 512, UPF 513, and provisioning system 514. Thus, data center 900 comprises one or more microprocessors and one or more non-transitory machine-readable storage media that store processing instructions that direct data center 900 to perform the methods described herein. Network data center 900 may be located at a single site or be distributed across multiple geographic locations.

In particular, UDR SW 909 stores identifying information for wireless communication user 501. UDR SW 909 stores identifying information for UE 503 in association with the user identifier for wireless network user 501. UE 503 registers with AMF SW 907 over 5GNR AN 504 and/or WIFI AN 505-IWF SW 906. AMF SW 907 interacts with UDM SW 908 to authenticate and authorize UE 503 for service—typically over Authentication and Security Function (AUSF) SW that is omitted for clarity. AMF SW 907 and UE 503 establish an N1 signaling link that traverses 5GNR AN 504 and/or WIFI AN 505-IWF SW 906. At this point, UE 503 requests slices other than slice 502, because UE 503 does not yet have NSSAI 515 and cannot request wireless network slice 502.

Provisioning system SW 914 adds Network Slice Selection Assistance Information (NSSAI) 515 for wireless network slice 502 to UDR SW 909 in association with the user identifier for wireless communication user 501. Thus, UDR SW 909 now stores NSSAI 515 for wireless network slice 502 in association with UE 503. UDR SW 909 detects NSSAI 515 for wireless communication user 501 and responsively identifies associated UE 503. UDR SW 909 sets a flag to note new NSSAI 515 for UE 503. UDR SW 909 signals UDM SW 908 to transfer new NSSAI 515 to UE 503.

UDM SW 908 determines if UE 501 is in communication with AMF SW 907 based the prior registration transaction with AMF SW 907 and the lack of a corresponding de-registration. In response to the indication of new NSSAI 515 for UE 503 from UDR SW 909 and to the active registration of UE 503 by AMF SW 907, UDM SW 908 transfers an HTTP message to AMF SW 907 to add NSSAI 515 to UE 503. In response to the HTTP message from UDM SW 908, AMF SW 907 transfers the HTTP message to UE 503 over the N1 signaling link that traverses 5GNR AN 504 and/or WIFI AN 505-IWF SW 906. The HTTP message delivery fails due to a communication error, corrupt message data, UE 503 error, AMF 507 error, or some other reason. Due to this failure, UDM SW 909 does not receive an HTTP message delivery acknowledgement and determines that the HTTP message delivery has failed.

In response to the HTTP message delivery failure, UDM SW 908 transfers another HTTP message to AMF SW 907 to add NSSAI 515 to UE 503. AMF SW 907 transfers the other HTTP message to UE 503 over the N1 signaling link that traverses 5GNR AN 504 and/or WIFI AN 505-IWF SW 906. The HTTP message delivery may fail again and the HTTP message would be transferred again in a similar manner. After a configured number of such failures, UDM SW 908 stops trying and generates a failure notice for UE 503 and NSSAI 515.

Typically, UE 503 will eventually receive the HTTP message with NSSAI 515, and in response, UE 503 transfers an HTTP message delivery acknowledgement to AMF SW 907. AMF SW 907 transfers the HTTP message delivery acknowledgement to UDM SW 908. In response to the HTTP message delivery acknowledgement, UDM SW 908 stops the re-transfer operations and signals UDR SW 909 that UE 503 has NSSAI 515. UDR SW 909 clears the flag that noted new NSSAI 515 for UE 503.

Figure 10:
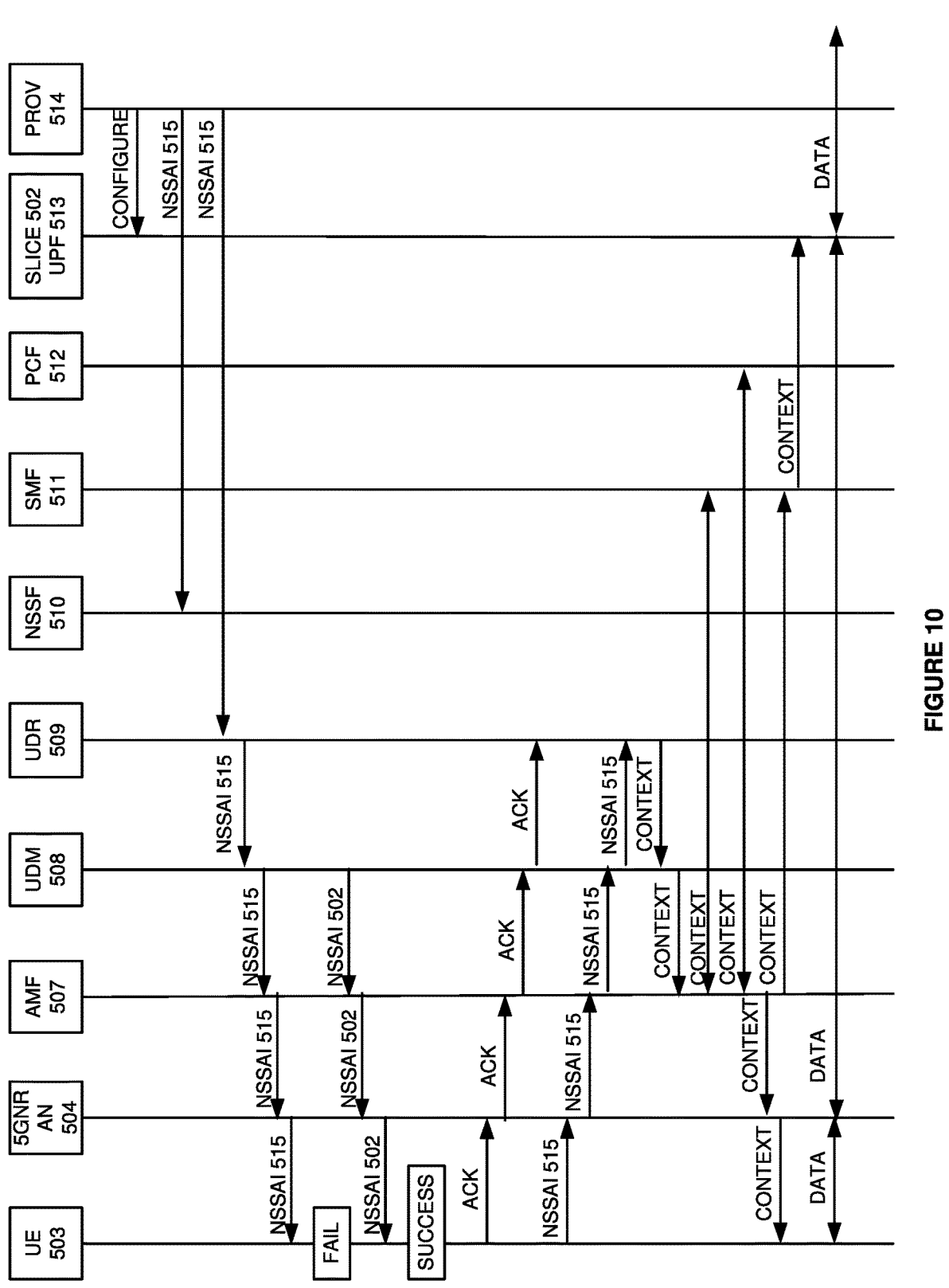
FIG. 10 illustrates an exemplary operation of the wireless communication network to modify wireless network slice information for a wireless communication user.

FIG. 10 illustrates an exemplary operation of wireless communication network 500 to modify NSSAI 515 for wireless communication user 501. The operation may vary in other examples. Provisioning system 514 configures UPF 513 to serve slice 502. Provisioning system 514 adds NSSAI 515 to NSSF 510. Provisioning system 514 adds NSSAI 515 for wireless network slice 502 to UDR 509 in association with the user identifier for wireless communication user 501 and UE 503. UDR 509 signals UDM 508 to transfer new NSSAI 515 to UE 503.

In response to the signaling from UDR 509, UDM 508 transfers an HTTP message to AMF 507 to add NSSAI 515 to UE 503. In response to the HTTP message from UDM 508, AMF 507 transfers the HTTP message to UE 503 over the N1 signaling link that traverses 5GNR AN 504 in this example. The HTTP message delivery fails due to a communication error, corrupt message data, UE 503 error, AMF 507 error, or some other reason. Due to this failure, UDM 509 does not receive an HTTP message delivery acknowledgement and determines that the HTTP message delivery has failed. In response to the HTTP message delivery failure, UDM 508 transfers another HTTP message to AMF 507 to add NSSAI 515 to UE 503. AMF 507 transfers the other HTTP message to UE 503 over the N1 signaling link that traverses 5GNR AN 504 in this example.

UE 503 receives this additional HTTP message with NSSAI 515, and in response, UE 503 transfers an HTTP message delivery acknowledgement (ACK) to AMF 507 over 5GNR AN 505. AMF 507 transfers the HTTP message delivery acknowledgement to UDM 508. In response to the HTTP message delivery acknowledgement, UDM 508 stops re-transfer operations and signals UDR 509 that UE 503 has NSSAI 515.

UE 503 requests NSSAI 515 from AMF 507 over 5GNR AN 504 in this example. AMF 507 requests the authorization of NSSAI 515 for UE 503 from UDM 508. UDM 508 verifies that UE 503 is authorized for slice 502 by checking NSSAI 515 for UE 503 in UDR 509. UDM 508 retrieves UE context for slice 502 from UDR 509. UDM 508 transfers UE context for slice 502 to AMF 507. AMF 507 and SMF 511 develop additional context for slice 502 and UE 503. AMF 507 and PCF 511 develop additional context for slice 502 and UE 503. AMF 507 transfers the context to SMF 511 which transfers some of the context to UPF 513 in slice 502. AMF 507 transfers some of the context to 5GNR AN 504. 5GNR AN 504 transfers some of the context to UE 503. UE 503 and UPF 513 in slice 502 exchange user data over 5GNR AN 514. UPF 513 in slice 502 exchanges the user data with one or more external systems (not shown).

In some examples, UDM 508 detects a modification to an NSSAI for a specific user device type. When UE 503 comprises the specific user device type and is in communication with AMF 507 over the N1, UDM 508 transfers the NSSAI modification for the user device type to wireless UE 503. In some examples, UDM 508 detects a modification to an NSSAI for a specific geographic location or TA. When UE 503 is located at the geographic location or TA and is in communication with AMF 507 over the N1, UDM 508 transfers the NSSAI modification for the geographic location or TA to wireless UE 503. In some examples, UDM 508 detects a modification to an NSSAI for a specific RAT. When UE 503 is using the specific RAT and is in communication with AMF 507 over the N1, UDM 508 transfers the NSSAI modification for the RAT to wireless UE 503. If the HTTP message delivery to UE 503 fails due to a communication error, corrupt message data, UE 503 error, AMF 507 error, or some other reason, then UDM 508 retries to send the message to UE 503 over AMF 507.

The wireless communication system circuitry described above comprises computer hardware and software that form special-purpose data communication circuitry to modify wireless network slice information for a wireless communication user. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to modify wireless network slice information for a wireless communication user.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to modify wireless network slice information for a wireless communication user, the method comprising:
    detecting a modification to the wireless network slice information for the wireless communication user;
    in response to the modification detection, transferring a slice information modification message to a wireless communication device for the wireless communication user;
    detecting a failure of the slice information modification message sent to the wireless communication device; and
    in response to the failure detection, transferring another slice information modification message to the wireless communication device.

2. The method of claim 1 wherein:
    detecting the modification to the wireless network slice information comprise detecting additional Network Slice Selection Assistance Information (NSSAI); and
    transferring the slice information modification message to the wireless communication device comprises transferring an NSSAI addition instruction to the wireless communication device.

3. The method of claim 1 wherein:
    detecting the modification comprise detecting a deletion of Network Slice Selection Assistance Information (NSSAI); and
    transferring the slice information modification message to the wireless communication device comprises transferring an NSSAI deletion instruction to the wireless communication device.

4. The method of claim 1 wherein:
    detecting the modification to the wireless network slice information comprise detecting a change to Network Slice Selection Assistance Information (NSSAI); and
    transferring the slice information modification message to the wireless communication device comprises transferring an NSSAI change instruction to the wireless communication device.

5. The method of claim 1 wherein:
    detecting the modification to the wireless network slice information comprise detecting the modification for a user device type; and further comprising
    determining that the wireless communication device comprises the user device type; and wherein
    transferring the slice information modification message to the wireless communication device comprises transferring the slice information modification message in response to determining that the wireless communication device comprises the user device type and is in communication with the wireless communication system.

6. The method of claim 1 wherein:

detecting the modification to the wireless network slice information comprise detecting the modification for a geographic area; and further comprising determining that the wireless communication device is in the geographic area; and wherein transferring the slice information modification message to the wireless communication device comprises transferring the slice information modification message in response to determining that the wireless communication device is in the geographic area and is in communication with the wireless communication system.

7. The method of claim 1 wherein transferring the slice information modification message to the wireless communication device in response to the modification detection comprises transferring the slice information modification message to the wireless communication device the slice information modification and before the wireless communication device performs a new network registration.

8. One or more non-transitory machine-readable storage media that store processing instructions that direct processing circuitry to modify wireless network slice information for a wireless communication user by performing a method comprising:

detecting a modification to the wireless network slice information for the wireless communication user;

in response to the modification detection, transferring a slice information modification message to a wireless communication device for the wireless communication user;

detecting a failure of the slice information modification message sent to the wireless communication device; and in response to the failure detection, transferring another slice information modification message to the wireless communication device.

9. The one or more non-transitory machine-readable storage media of claim 8 wherein:

detecting the modification to the wireless network slice information comprise detecting additional Network Slice Selection Assistance Information (NSSAI); and transferring the slice information modification message to the wireless communication device comprises transferring an NSSAI addition instruction to the wireless communication device.

10. The one or more non-transitory machine-readable storage media of claim 8 wherein:

detecting the modification to the wireless network slice information comprise detecting a deletion of Network Slice Selection Assistance Information (NSSAI); and transferring the slice information modification message to the wireless communication device comprises transferring an NSSAI deletion instruction to the wireless communication device.

11. The one or more non-transitory machine-readable storage media of claim 8 wherein:

detecting the modification to the wireless network slice information comprise detecting a change to Network Slice Selection Assistance Information (NSSAI); and transferring the slice information modification message to the wireless communication device comprises transferring an NSSAI change instruction to the wireless communication device.

12. The one or more non-transitory machine-readable storage media of claim 8 wherein:

detecting the modification to the wireless network slice information comprise detecting the modification for a user device type; and further comprising determining that the wireless communication device comprises the user device type; and wherein transferring the slice information modification message to the wireless communication device comprises transferring the slice information modification message in response to determining that the wireless communication device comprises the device type and is in communication with the wireless communication system.

13. The one or more non-transitory machine-readable storage media of claim 8 wherein:

detecting the modification to the wireless network slice information comprise detecting the modification for a geographic area; and further comprising determining that the wireless communication device is in the geographic area; and wherein transferring the slice information modification message to the wireless communication device comprises transferring the slice information modification message in response to determining that the wireless communication device is in the geographic area and is in communication with the wireless communication system.

14. The one or more non-transitory machine-readable storage media of claim 8 wherein transferring the slice information modification message to the wireless communication device in response to the modification detection comprises transferring the slice information modification message to the wireless communication device after the slice information modification and before the wireless communication device performs a new network registration.

15. A wireless communication network to modify wireless network slice information for a wireless communication user, the wireless communication system comprising:

a Unified Data Repository (UDR) to detect a modification to the wireless network slice information for the wireless communication user, and in response, to notify a Unified Data Management (UDM) of the modification to the wireless network slice information for the wireless communication user;

in response to the notification from the UDR, the UDM to determine when a wireless User Equipment (UE) for the wireless communication user is in communication with the wireless communication system, and in response to the determination that the wireless UE is in communication with the wireless communication system, the UDM to transfer a request to an Access and Mobility Management Function (AMF); and in response to the request from the UDM, the AMF to transfer a slice information modification message to the wireless UE.

16. The wireless communication network of claim 15 wherein:

the UDM is to detect a failure of the slice information modification message sent by the AMF to the wireless UE; and in response to the failure detection, the UDM is to transfer another request to the AMF; and the AMF is to transfer another slice information modification message to the wireless UE.

17. The wireless communication network of claim 15 wherein:

the AMF is to receive an acknowledgement from the wireless UE when the wireless UE modifies the wireless network slice information in response to the slice information modification message;

the AMF is to transfer a response to the UDM when the acknowledgement is received; and the UDM is to detect a message failure when the response is not received from the AMF, and in response, the UDM is to transfer another request to the AMF; and the AMF is to transfer another slice information modification message to the wireless UE.

18. The wireless communication network of claim 15 wherein:

the UDR is to detect an addition, change, or deletion of Network Slice Selection Assistance Information (NS-SAI) to detect the modification to the wireless network slice information;

the UDR is indicate the addition, the change, or the deletion of the NSSAI to notify the UDM;

the UDM is to indicate the addition, the change, or the deletion of the NSSAI to transfer the request to the AMF; and the AMF is to indicate the addition, the change, or the deletion of the NSSAI to transfer the slice information modification message to the wireless UE.

16

19. The wireless communication network of claim 15 wherein:

the UDR is to detect the modification to the wireless network slice information for a user device type to detect the modification to the wireless network slice information; and further comprising the UDM to determine that the wireless UE comprises the user device type; and wherein the UDM is to transfer the request to the AMF when the wireless UE comprises the user device type and is in communication with the wireless communication system.

20. The wireless communication network of claim 15 wherein:

the UDR is to detect the modification to the wireless network slice information for a geographic area to detect the modification to the wireless network slice information; and further comprising the UDM to determine that the wireless UE is in the geographic area; and wherein the UDM is to transfer the request to the AMF when the wireless UE is in the geographic area and is in communication with the wireless communication system.

\* \* \* \* \*